US009745205B1

(12) United States Patent
Yao et al.

(10) Patent No.: US 9,745,205 B1
(45) Date of Patent: Aug. 29, 2017

(54) NON-LITHIUM METAL ION BATTERY ELECTRODE MATERIAL ARCHITECTURE

(71) Applicant: University of Houston System, Houston, TX (US)

(72) Inventors: Yan Yao, Pearland, TX (US); Yanliang Liang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 0 days.

(21) Appl. No.: 15/626,275

(22) Filed: Jun. 19, 2017

Related U.S. Application Data (62) Division of application No. 14/274,169, filed on May 9, 2014.

(60) Provisional application No. 61/822,109, filed on May 10, 2013.

(51) Int. Cl.
| | |
|---|---|
| *H01M 4/13* | (2010.01) |
| *C01G 39/06* | (2006.01) |
| *H01M 4/58* | (2010.01) |
| *H01M 4/36* | (2006.01) |
| *H01M 4/38* | (2006.01) |
| *C01G 39/00* | (2006.01) |
| *H01M 4/62* | (2006.01) |

(52) U.S. Cl.
CPC .......... *C01G 39/06* (2013.01); *C01G 39/006* (2013.01); *H01M 4/36* (2013.01); *H01M 4/38* (2013.01); *H01M 4/581* (2013.01); *H01M 4/5815* (2013.01); *H01M 4/622* (2013.01); *C01P 2002/20* (2013.01); *C01P 2002/72* (2013.01); *C01P 2002/78* (2013.01); *C01P 2006/40* (2013.01)

(58) Field of Classification Search
CPC ........ H01M 4/5815; H01M 4/36; H01M 4/38; H01M 4/581; H01M 4/622; C01G 39/06; C01G 39/006; C01P 2006/40; C01P 2002/20; C01P 2002/72; C01P 2002/07
USPC ... 429/212, 231.9, 231.6, 218.1, 231.5, 229, 429/225, 224, 223, 222, 220
See application file for complete search history.

(56) References Cited

U.S. PATENT DOCUMENTS

| | | | |
|---|---|---|---|
| 2010/0062280 A1 | 3/2010 | Sadaoka et al. | |
| 2011/0159381 A1 | 6/2011 | Doe et al. | |
| 2011/0262810 A1* | 10/2011 | Lemmon ............... | H01M 4/134 429/216 |
| 2012/0021293 A1 | 1/2012 | Zhamu et al. | |
| 2013/0224583 A1* | 8/2013 | Green .................... | B82Y 30/00 429/211 |

OTHER PUBLICATIONS

PCT/US2014/037502 International Search Report and Written Opinion dated Sep. 29, 2014 (12 p.).

(Continued)

*Primary Examiner* — Gary Harris
(74) *Attorney, Agent, or Firm* — Conley Rose. P.C.

(57) ABSTRACT

A method for configuring a non-lithium-intercalation electrode includes intercalating an insertion species between multiple layers of a stacked or layered electrode material. The method forms an electrode architecture with increased interlayer spacing for non-lithium metal ion migration. A laminate electrode material is constructed such that pillaring agents are intercalated between multiple layers of the stacked electrode material and installed in a battery.

12 Claims, 9 Drawing Sheets

(56) References Cited

OTHER PUBLICATIONS

Golub, A.S., et al., "Molybdenum Disulfide-Polymer Nanocomposite Structures with Different Sequences of Alternating Inorganic and Organic Layers," Russian Chemical Bulletin, International Edition, vol. 61, No. 10, pp. 1950-1958, Oct. 2012 (9 p.).

Yang, Siqi, et al., "First-Principles Study of Zigzag MoS2 Nanoribbon as a Promising Cathode Material for Rechargeable Mg Batteries," The Journal of Physical Chemistry, vol. 116, pp. 1307-1312, 2012 (6 p.).

Office Action dated Sep. 21, 2016, for U.S. Appl. No. 14/274,169 (9 p.).

Response to Office Action dated Sep. 21, 2016, for U.S. Appl. No. 14/274,169; Response filed Dec. 28, 2016 (10 p.).

Notice of Allowance dated May 2, 2017, for U.S. Appl. No. 14/274,169 (9 p.).

\* cited by examiner

NON-LITHIUM METAL ION BATTERY ELECTRODE MATERIAL ARCHITECTURE

CROSS-REFERENCE TO RELATED APPLICATIONS

This application is a divisional of U.S. application Ser. No. 14/274,169 filed May 9, 2014, and entitled "Non-Lithium Metal Ion Battery Electrode Material Architecture," which claims priority to U.S. Provisional Patent Application No. 61/822,109 filed on May 10, 2013 and titled "Non-Lithium Metal Ion Battery Electrode Material Architecture," each of which is incorporated herein by reference in its entirety for all purposes.

STATEMENT REGARDING FEDERALLY SPONSORED RESEARCH OR DEVELOPMENT

Not applicable.

BACKGROUND

Field of the Disclosure

This disclosure relates to a secondary or rechargeable battery, specifically to modifying a battery's electrode matrix for use in non-lithium metal ion applications.

Background

Developing high energy, high power, and safe batteries is of great significance so as to address the society's energy needs, such as distributed power sources, electric vehicles, and devices that handle large amounts of power. Among current battery techniques, lithium-ion batteries featuring the highest energy and power density have dominated the portable electronics market. When lithium-ion batteries are to be scaled up, however, the availability of lithium will also become a limitation. The global production of lithium can presently only satisfy half the need to convert the annually produced >60 million cars into plug-in hybrid electric vehicles (EVs) which are powered by both combustion engines and rechargeable lithium batteries. With the continued adoption of EV's, the lithium supply deficit is expected to worsen because these vehicles carry several times more batteries onboard. Although lithium reserves in sea water are rich, exploitation from the sea is presently too expensive to constitute a significant portion of lithium production.

Recent efforts to develop scalable high-energy batteries have turned attention to non-lithium techniques such as room-temperature rechargeable magnesium and sodium batteries which work in a similar way as lithium-ion batteries. Magnesium and sodium are earth abundant elements and are cheaply produced in huge amounts as shown in Table 1.

TABLE 1

Comparison of Key Parameters of Lithium, Magnesium, and Sodium

|  | Lithium | Magnesium | Sodium |
|---|---|---|---|
| Gravimetric Capacity (mAh g$^{-1}$) | 3861 | 2205 | 1166 |
| Volumetric Capacity (mAh cm$^{-3}$) | 2066 | 3833 | 1128 |
| Potential (V vs NHE) | −3.04 | −2.372 | −2.71 |
| Global Production (kg yr$^{-1}$) | 2.5 × 10$^7$ (very low) | 6.3 × 10$^9$ (high) | 10$^{10}$ (high) |
| Price (carbonate; $ ton$^{-1}$) | 5000 | 600 | 200 |
| M$^{n+}$ Radius (Å) | 0.68 | 0.65 | 0.95 |
| Polarization Strength (10$^5$/pm$^{-2}$) | 21.6 | 47.3 | 11.1 |

Generally, the electrodes based on light-weight multivalent metals such as magnesium and aluminum provide some advantages over the conventional lithium. For example, they may offer up to seven times higher volumetric specific capacity than lithium-ion battery anodes, including graphite and $Li_4Ti_5O_{12}$. In addition, their redox potentials are 0.7-1.4 V higher than lithium, implying potentially better safety; but not too high (e.g. the redox potential of aluminum is lower than the popular anode $Li_4Ti_5O_{12}$) so that the theoretically achievable working potential is not compromised. Studies on the electrochemical deposition of magnesium showed that magnesium can be plated in a uniform dendrite-free manner and will serve as a safe anode material. Rechargeable magnesium batteries are therefore regarded as a potentially low-cost, ultra-high energy, and safe technology for energy storage.

Rechargeable batteries based on non-lithium metals share similar chemistry and fabrication techniques as those for rechargeable lithium batteries, while possessing the advantages of lower costs and better safety. However, most materials used for non-lithium metal storage have met with limited intercalation extent and inferior reversibility. A wide range of intercalation compounds have been screened for magnesium storage, including layered transition metal chalcogenides, transition metal oxides, and polyanionic magnesium salts. All these categories of compounds are established intercalation hosts for lithium battery cathodes. However, when they are directly used in the bulk form as cathodes, only Cheveral phase chalcogenides have exhibited practical magnesium intercalation. Currently, other compounds show continuous capacity fade after the initial activation stage. For oxides, no practical cycling stability has been reported and, to date, there is no cathode material exhibiting practical energy density and cyclability suitable for electrochemical storage of multivalent metal ions. For aluminum batteries, only $V_2O_5$ and $TiO_2$ have been attempted as cathodes but, neither has exhibited practical energy density. Studies on sodium-ion batteries have also revealed intercalation chemistry that is different from their lithium-based counterparts. Many more plateaus are observed in the charge-discharge curves for electrochemical sodium intercalation, implying complex multi-phase reactions with frequent structural transformation which are detrimental to cycling stability.

Generally, the aforementioned disadvantages associated with the intercalation of non-lithium metal cations appear to be related to the fact that all these cations are larger or more polarizing than the $Li^+$ ion. Compared to the $Li^+$ ion, the $Na^+$ ion has the same charge number but a significantly larger ionic radius (0.95 Å, cf 0.68 Å for $Li^+$). As a result of steric effects, the $Na^+$ ion exhibits sluggish intercalation/diffusion kinetics in frameworks commonly employed for Li storage. The $Mg^{2+}$ ion has a similar ionic radius (0.65 Å) to Li but double the charge number, hence exhibiting high polarizing ability. The strong interaction of the multivalent $Mg^{2+}$ ion with the negatively charged atoms in the host material makes the diffusion of $Mg^{2+}$ difficult.

SUMMARY

This disclosure relates to a non-lithium ion metal electrode matrix to increase the multivalent metal-ion batteries' performance. These batteries provide an ultra-high-density energy storage that is aimed at providing substantially higher volumetric energy densities relative to lithium-ion batteries. The intrinsic safety of these batteries adds to the flexibility in packaging battery system, for example in electric vehicle applications. Other applications include energy storage solutions for distributed power source, grid, and EV applications.

In exemplary instances, there is disclosed a method for modifying a battery electrode material comprising introducing insertion species into a composition of $A_xM_yN_z$ and at least one non-lithium metal ion, delaminating the $A_xM_yN_z$, exposing the delaminated $A_xM_yN_z$ to a solution containing the insertion species, and restacking the delaminated $A_xM_yN_z$ around the insertion species.

Also, there is disclosed a battery electrode material architecture comprising a composition of $A_xM_yN_z$, a pillaring agent, and at least one non-lithium metal ion $X^{n+}$. Configured thusly, A is at least one low-valence element chosen from the group consisting of H, alkaline, and alkaline earth metals, and $0 \leq x \leq 1.5$, M is at least one metal and $1 \leq y \leq 2.5$, and N is at least one non-metal element chosen from the group consisting of O, S, Se, N, P, Br, and I, and $1.8 \leq z \leq 4.2$. In instances, X is at least one non-lithium metal ion chosen from the group consisting of Na, K, Mg, Ca, Al, Ga, and Y, and $1 \leq n \leq 3$. In further instances, the pillaring agent comprises at least one electrically neutral polymer containing O, N, F, and/or S atoms.

Likewise, there is disclosed a battery having an electrolyte in contact with a battery electrode material architecture comprising a composition of $A_xM_yN_z$, a pillaring agent, and at least one non-lithium metal ion $X^{n+}$. Configured thusly, A is at least one low-valence element chosen from the group consisting of H, alkaline, and alkaline earth metals, and $0 \leq x \leq 1.5$, M is at least one metal and $1 \leq y \leq 2.5$, and N is at least one non-metal element chosen from the group consisting of O, S, Se, N, P, Br, and I, and $1.8 \leq z \leq 4.2$. In instances, X is at least one non-lithium metal ion chosen from the group consisting of Na, K, Mg, Ca, Al, Ga, and Y, and $1 \leq n \leq 3$. In further instances, the pillaring agent comprises at least one electrically neutral polymer containing O, N, F, and/or S atoms.

Additional features and characteristics of the disclosed embodiments will be explained in the description which follows and will be apparent to those having ordinary skill in the art upon examination of the following discussion.

BRIEF DESCRIPTION OF THE DRAWINGS

For a detailed description of the disclosed embodiments, reference will now be made to the accompanying drawings in which.

DETAILED DESCRIPTION

Figure 1:
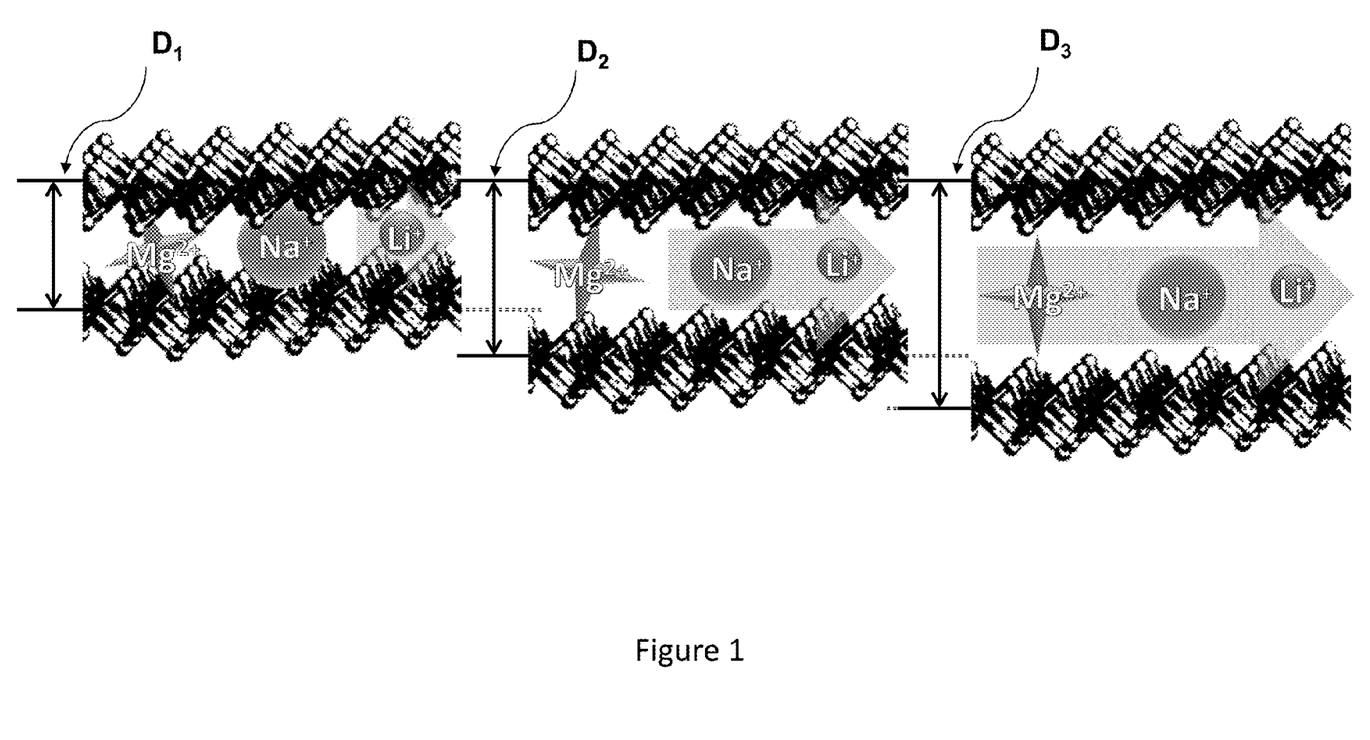
FIG. 1 schematically illustrates the diffusion of non-lithium metal ions in layered materials as facilitated with the increase of interlayer space according to an embodiment of the present disclosure.

Overview:

The difficulty in intercalation/diffusion of metal cations in existing materials is induced by strong interactions between metal cations and host materials. These can be alleviated when the lattice of the host materials is enlarged by insertion of additional species including polymers, molecules, and inorganic and organometallic clusters. For example, as shown in FIG. 1, fine-tuning the interlayer distance $D_1$ of layered materials according to the specific cation to be intercalated permits implementation of non-lithium metal cations. In FIG. 1, the interlayer distance or spacing $D_1$ only permits the passage of lithium but, when expanded, the interlayer spacing shown as $D_2$ and $D_3$ no longer restricts the diffusion of non-lithium metal cations. The expansion of the lattice spacing by intercalation of pillaring agents is an efficient and general strategy to modify common electrode materials and matrices for efficient electrochemical storage of non-lithium metal cations. Electrode materials previously developed for lithium-ion batteries may be modified according to the present disclosure to meet the requirements for intercalation of non-lithium metals.

The electrode materials are configured for use in a battery. Generally, a battery comprises an enclosure having an electrolyte therein. The electrolyte may be any material that ionizes in response to an applied voltage, thus converting chemical energy to electrical energy. Further, the electrolyte may be a liquid, a gel, or a polymer electrolyte without limitation. The electrode materials extend into the enclosure and contact the electrolyte. In instances, the electrode materials may be in electrical communication with an electric circuit external to the battery enclosure.

Matrix:

The structural expansion of the electrode materials according to the present disclosure is effective for multiple classes of intercalation hosts and more specifically applicable to layered compounds. In some configurations, the electrode materials have a formula $A_xM_yN_z$, ($0 \leq x \leq 1.5$, $1 \leq y \leq 2.5$, $1.8 \leq z \leq 4.2$). In these configurations, A is one of or a mixture of low-valence elements including but not limited to H (hydrogen), and alkaline and alkaline earth metals. Exemplary alkaline and alkaline earth metals include at least one element chosen from Li, Na, K, Mg, and Ca, without limitation. Further, M is at least one metal chosen from Ti, Zr, V, Ta, Cr, Mo, W, Mn, Fe, Co, Ni, Cu, Zn, Cd, Ga, In, Sn, Pb, Sb, Bi, and Te, without limitation. Also, N is at least one element chosen from O, S, Se, N, P, Br or I, without limitation Insertion Species:

A controlled amount of electrically neutral pillaring agents is inserted into the lattice spacing of the electrode material intercalation hosts to obtain and stabilize a predetermined interlayer lattice parameter. As used herein, the terms "insertion species," "intercalation species," and "pillaring agents" are used interchangeably and have the same meaning. Therefore, as disclosed, insertion species, intercalation species, and pillaring agents may be inserted in the interlayer spaces of a layered electrode material, for example having the formula $A_xM_yN_z$ discussed hereinabove. Further, the distance of interlayer lattice parameter is determined at least partially by the specific cation to be intercalated and thus, the amount of pillaring agents is likewise determined. Pillaring agents comprise polymers containing O, N, F, and/or S atoms such as poly(ethylene oxide), poly(propylene glycol), poly(vinylpyrrolidinone), methyl cellulose, polyethyleneimine, poly(aniline), and polypyrrole and molecules containing O, N, F, and/or S atoms such as alkylamines comprising diethylamine, dibutylamine, dipentylamine, N-isopropylcyclohexylamine, and dicyclohexylamine and glymes comprising diglyme, triglyme, and tetraglyme. Upon insertion, the pillaring agents show a characteristic lattice expansion of 1-300% in at least one dimension of the layered composite electrode material. Without limitation by any particular theory, controlling the size and amount of the intercalated species likewise controls the interlayer distance of all composites, and thusly can be continuously tuned for the metal ion.

Figure 3:
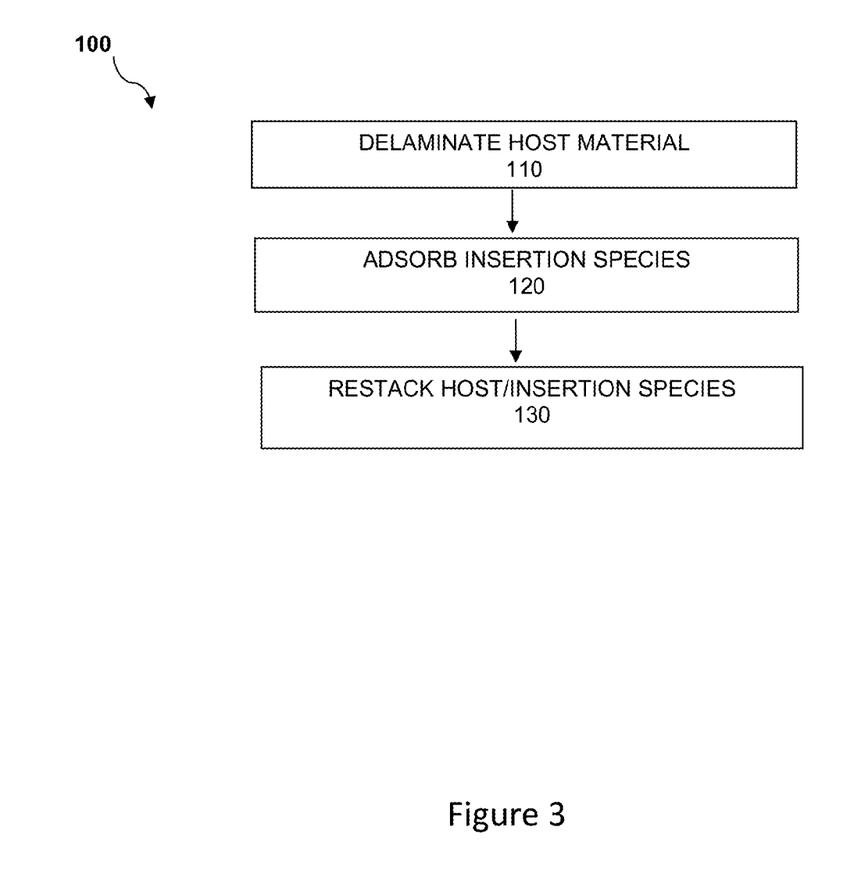
FIG. 3 illustrates a schematic of the method of constructing an electrode according to an embodiment of the present disclosure.

Composite Formation:

The disclosed composite electrode materials are synthesized by a general delamination-adsorption-restacking procedure. This electrode material synthesis method 100 is illustrated in FIG. 3. The method 100 comprises the steps of delaminating the host material 110, adsorbing the insertion species 120, and restacking the host material 130. In the method 100, delaminating the host material 110 comprises at least one approach including physical exfoliation, electrochemical reduction/oxidation, chemical reduction/oxidation, or combinations thereof. Without limitation, the host material $A_xM_yN_z$ may be considered delaminated, exfoliated, or opened such that individual layers are not associated. Delaminating the host material 110 further comprises dispersing the exfoliated $A_xM_yN_z$ host material in one or a combination of solvents. In some instances, any inorganic or organic solvent may be used and in certain instances, water may be used as a solvent. Subsequently, adsorbing the insertion species 120 comprises exposing the delaminated host material to a solution containing the insertion species. In certain instances, the insertion species may be dispersed in the solvent for adsorbing the insertion species 120. Further, the insertion species may be agitated or mixed such that the surfaces of the delaminated host materials are coated in the species. Restacking the host material 130 comprises reforming the layered structure comprising the host material around the insertion species. Generally, restacking the host material 130 comprises solvent extraction. Exemplary solvent extractions may include at least one of the processes chosen from filtration, centrifugation, drying, or combinations thereof. In some instances, restacking the host material 130 comprises a temperature ranging from −80° C. to 150° C. In certain instances, the process for restacking the host material may be predetermined by the solvent used during delaminating the host material 110.

Electrode Architecture:

The present disclosure relates to expanding the interlayer spacing of intercalation hosts as a general strategy for electrode materials for storage of non-lithium metal cations. The structural expansion is applicable to various intercalation hosts, however the current disclosure specifically relates to layered materials. Layered metal chalcogenides (LMCs) such as $MoS_2$ is used as a model system because of its established intercalation chemistry and wide deployment as cathode materials in rechargeable lithium batteries. LMCs are typical two-dimensional materials held by strong covalent metal-sulfur bonds within a layer but weak van der Waals force between the layers. Into the weakly held LMC interlayers a range of species including ions, molecules, polymers, and even nanoclusters can be intercalated to form interlayer-expanded composites. By controlling the size and amount of the intercalated species, the interlayer distance is readily tuned.

In some instances, poly(ethyleneoxide) (PEO) is utilized in a configuration of this electrode architecture. The crystal structure and definite chemical composition of a range of LMC-PEO intercalate composite allow for a precise tuning of the interlayer distance over a wide range. In a nonlimiting exemplary configuration using $MoS_2$, the interlayer spacings may be controlled in a distance of about 6.1 Å to about 16 Å. Contrary to conventional inert intercalating agents which block the entrance and diffusion of the target cations, the PEO is a solid-state cation conductor that facilitates ion transport within layers. Also, the flexible and mobile segments of PEO also make room for ingressing cations. Recognizing that PEO itself is the major component of solid-state polymer electrolytes, the intercalated PEO may increase the weight to the electrode. However its capability for ion transport lowers the required amount of additional electrolyte, thereby maintaining or improving the energy density of the whole cell.

$MoS_2$-PEO intercalate composites with tunable interlayer distances are synthesized following a lithiation-delamination-restacking procedure. Synthetic parameters including particle size of the pristine $MoS_2$, molecular weight of PEO, and the mass ratio of $MoS_2$ to PEO are controlled towards desired lattice spacing of the resulted composite architectures. Electrochemical intercalation of non-lithium ions in these modified $MoS_2$ are then measured in three-/two-electrode cells.

Figure 4:
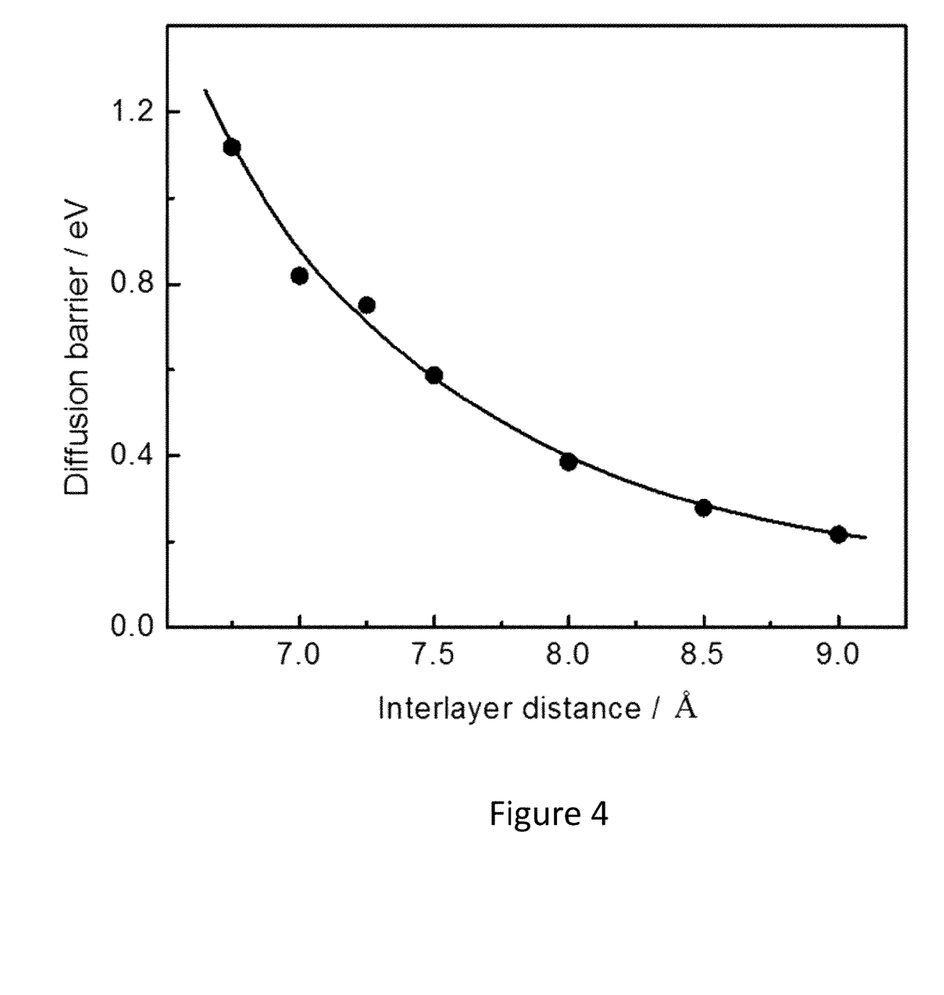
FIG. 4 illustrates the energy barrier for the diffusion of $Mg^{2+}$ in $MoS_2$ as a function of interlayer distance.
Figure 7:
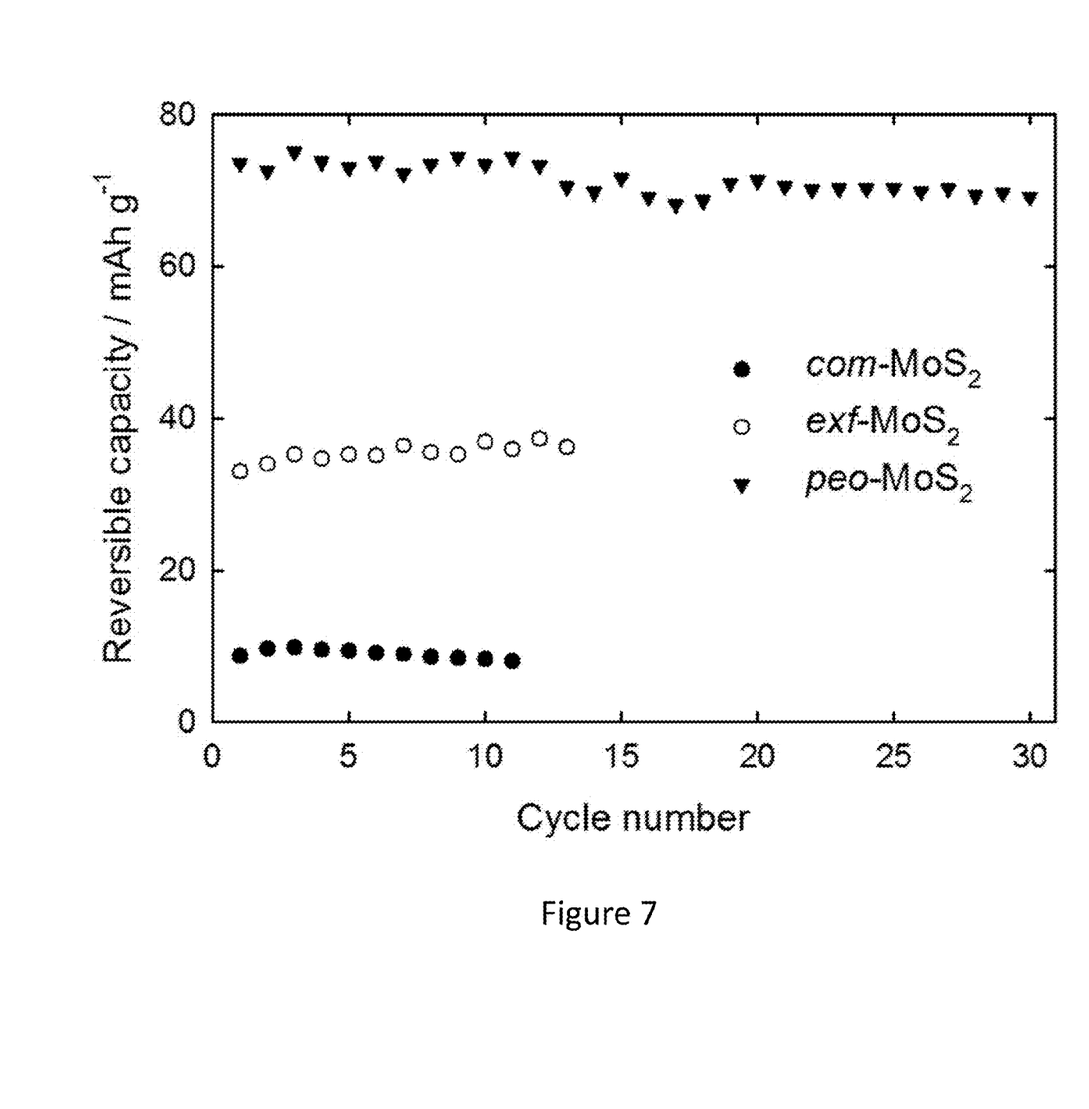
FIG. 7 illustrates the cycling stability of magnesium intercalation in $MoS_2$ samples with different interlayer distance.

Further Discussion:

Through the analysis of the intercalation behavior non-lithium cations in expanded structures of $MoS_2$, the relationship between interlayer distance of the host and the intercalation kinetics of cations is identified herein. Theoretical modeling has confirmed that as the interlayer space of $MoS_2$ increases, the energy barrier for $Mg^{2+}$ cation diffusion within the host decreases as shown in FIG. 4. The improved intercalation properties of the host results in increased capacity and/or cycling stability. The unmodified $MoS_2$ shows a negligible capacity (~9 mAh/g) in a Mg-ion cell. The insertion of PEO in the lattice increase the capacity by 8 folds to ~70 mAh/g and stably cycle at a reasonable current density of 33 mA/g as shown in FIG. 7. This result represents an example that even materials which are usually considered not capable of Mg intercalation can be transformed into a capable material by the interlayer engineering strategy disclosed herein. In another case, $MoS_2$ with different interlayer distances exhibit comparable initial capacities during sodium (de-)intercalation, but the cycling stability is considerably different, i.e. the larger the interlayer distance is, the better the capacity retention is. This observation can be rationalized as that a more open crystal gallery is less susceptible to structural damage during the (de-)intercalation of large cations and thus makes more suitable intercalation host. The modified $MoS_2$ represent a new high-performance electrode material for rechargeable magnesium/sodium batteries. Further, the modification of $MoS_2$ can be readily applied to other LMCs (e.g. $TiS_2$ and $VS_2$) which feature higher energy densities. Importantly, the interlayer expansion method according to the present disclosure could be extended to other layered materials such as transition metal oxides, leading to a large family of electrode materials.

To further illustrate various exemplary embodiments of the present invention, the following examples are provided.

EXAMPLES

Figure 2:
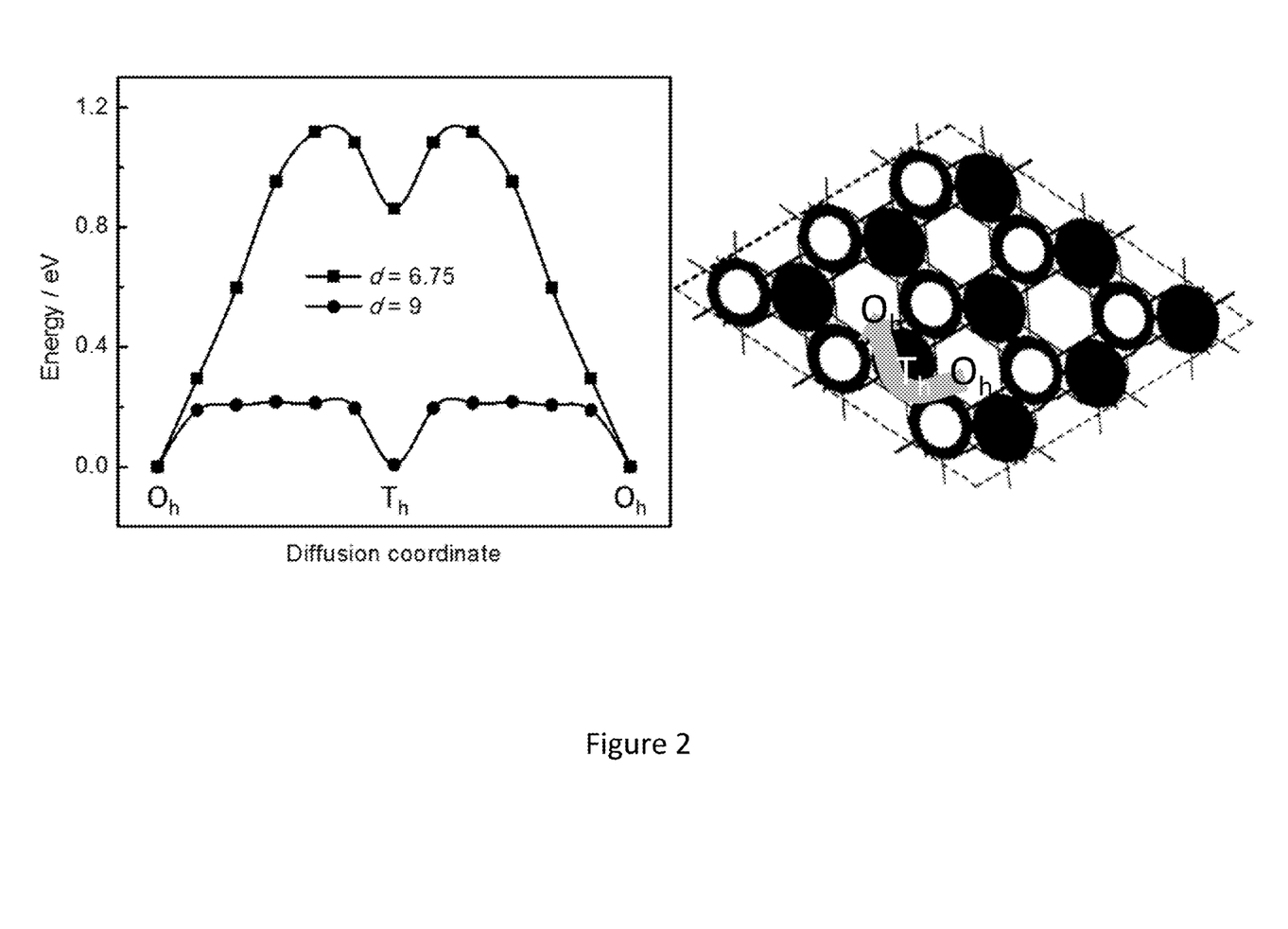
FIG. 2 illustrates the diffusion path of a $Mg^{2+}$ in $MoS_2$ and compares the energy change along the diffusion path with two different interlayer distances.

Example 1: Theoretical Demonstration of Enhanced $Mg^{2+}$ in Modified $MoS_2$ with Increased Interlayer Spacing FIG. 2 shows that regardless of the interlayer distance, the $Mg^{2+}$ migrates first from an $O_h$-site to a $T_h$-site then to the other $O_h$ site. The binding energy for the Mg—$MoS_2$ intercalate, defined as the difference between the energy of Mg-intercalated $MoS_2$ and the sum of those of $MoS_2$ and Mg atom, changes along the diffusion path. To migrate between two $O_h$-sites, $Mg^{2+}$ should first overcome an energy barrier, or diffusion barrier, to diffuse from the more stable $O_h$-site to a semi-stable $T_h$-site, and then overcome another smaller barrier to reach another $O_h$-site. The energy barrier for the diffusion process is 1.12 eV and 0.22 eV for an interlayer distance of 6.75 Å and 9 Å, respectively. This five-fold difference in diffusion barrier that occurred with a merely ~2 Å increase in interlayer distance indicates that the spacing expansion in the interlayer can effectively improve the $Mg^{2+}$ diffusion kinetics. A complete picture of the correlation between diffusion barrier and $MoS_2$ interlayer distance is shown in FIG. 4.

Figure 5:
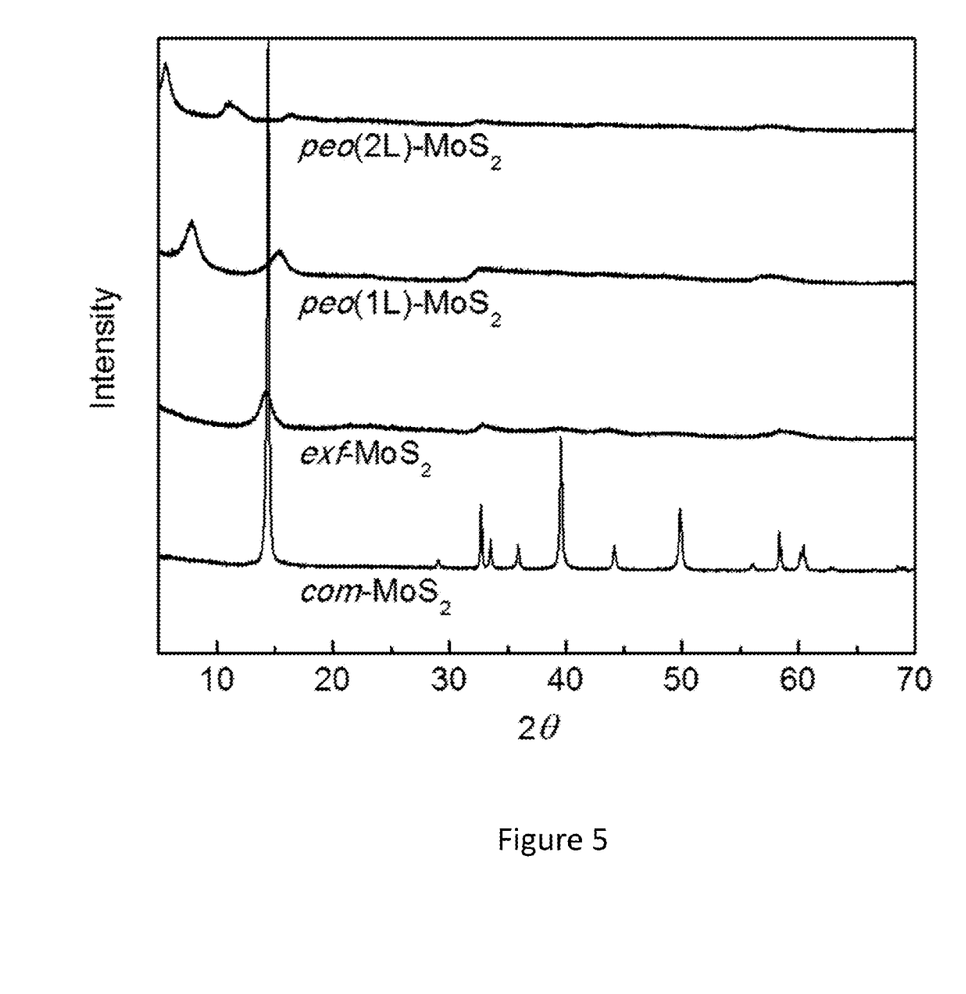
FIG. 5 illustrates the X-ray diffraction pattern of $MoS_2$ samples with different interlayer distances.

Example 2: Synthesis of (PEO-)$MoS_2$ Composites with Different Interlayer Distance $MoS_2$ was soaked in the solution of an excess of n-butyllithium in hexane to form lithiated $Li_xMoS_2$. The lithiated product was exfoliated in water to form a form a quasi-stable suspension of single-layered $MoS_2$ sheets. A controlled amount of PEO, 0-200% w/w relative to $MoS_2$, was added to the suspension. The mixture was centrifuged, washed with water, and dried to afford the restacked $MoS_2$ composites with different interlayer distance. FIG. 5 shows the X-ray diffraction patterns of the modified $MoS_2$ composites as well as a commercial sample without any modification. Among the various PEO-$MoS_2$ ratios studied (0-2), three ratios, namely 0, 0.25, and 1, are shown as representatives of PEO-$MoS_2$ composites with zero, one, and two layers of PEO intercalated within two slabs of $MoS_2$ sheets, respectively. The diffraction peak corresponding to the interlayer spacing shifts to lower angles as the amount of intercalated PEO increases. With the aid of Bragg equation, the interlayer distances of samples are calculated to be 6.14 Å (pristine $MoS_2$, or com-$MoS_2$), 6.22 Å (exfoliated $MoS_2$ restacked in the absence of PEO, or exf-$MoS_2$), 11.42 Å ($MoS_2$-PEO composite with one layer of intercalated PEO, or peo(1L)-$MoS_2$), and 15.8 Å ($MoS_2$-PEO with two layers of PEO, or peo(2L)-$MoS_2$), confirming that efficient tuning of the interlayer spacing of $MoS_2$ is achieved.

Figure 6:
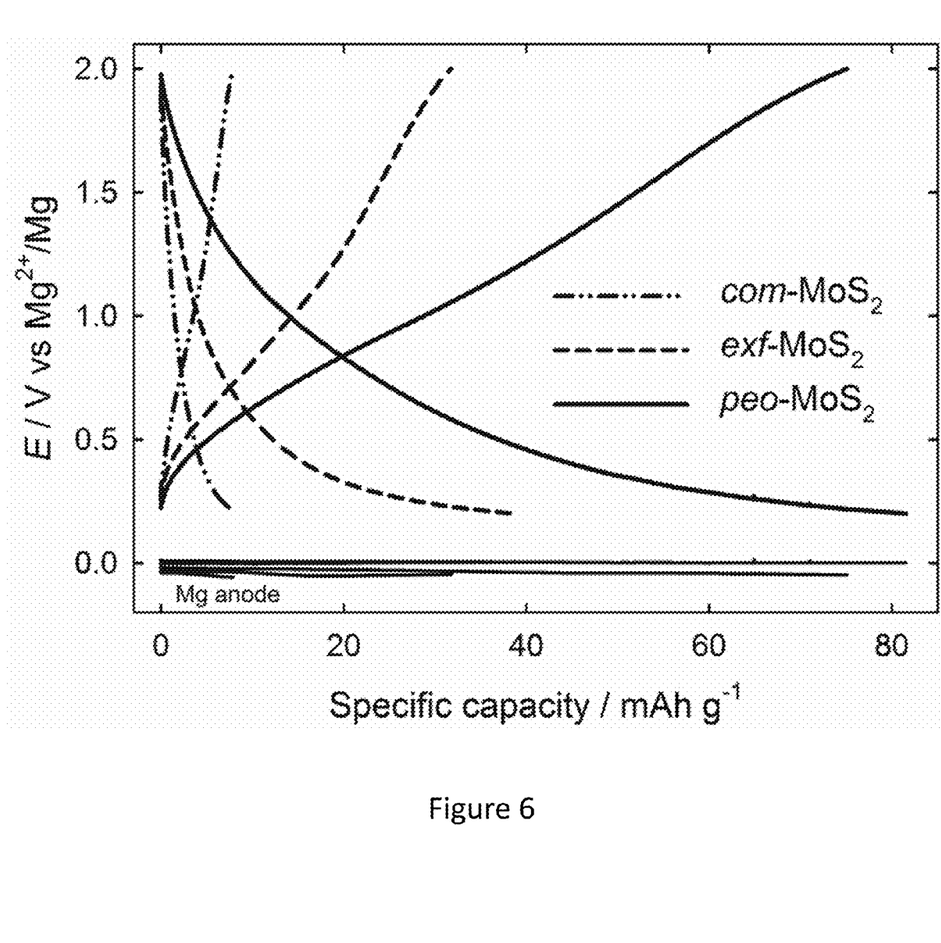
FIG. 6 illustrates the discharge-charge profile of magnesium intercalation in $MoS_2$ samples with different interlayer distance at the tenth cycle.

Example 3: $MoS_2$ Composites with Different Interlayer Distance as Intercalation Host for Mg-Ion The electrochemical performance of $MoS_2$ composites as intercalation host materials for Mg-ion was demonstrated with three-electrode cells. A slurry of the desired $MoS_2$ composite (70 wt. %), Super-P carbon (20 wt. %), and polyvinylidene fluoride (10 wt. %) dispersed in N-methyl-2-pyrrolidone was spread on a piece of stainless steel mesh and dried to form the working electrode. Freshly polished magnesium foil was used as both the counter and reference electrodes. A solution of 0.25 M $[Mg_2Cl_3]^+[AlPh_2Cl_2]^-$ in tetrahydrofuran served as the electrolyte. Three $MoS_2$ samples, including the commercially available unmodified $MoS_2$ (com-$MoS_2$), the exfoliated $MoS_2$ restacked without the addition of PEO (exf-$MoS_2$), and a $MoS_2$ composite obtained with the addition of 27 wt. % of PEO (relative to the weight of $MoS_2$; peo-$MoS_2$) were compared in this configuration. At the same charge-discharge current density of 33 mA/g, all three samples allow for reversible $Mg^{2+}$ (de-)intercalation and exhibit similar cycling stability, but the capacities vary significantly (FIGS. 6 & 7). The unmodified $MoS_2$ delivers a low specific capacity of ~9 mAh/g. A slight increase in the interlayer distance from 6.14 Å (com-$MoS_2$) to 6.22 Å (exf-$MoS_2$) leads to a three-time increase in capacity to ~35 mAh/g. The peo-$MoS_2$ composite containing PEO achieves the highest capacity of ~70 mAh/g, which is double of that of exf-$MoS_2$. The higher capacity for $MoS_2$ composites with larger interlayer spacing indicates more accessible intercalation sites in the lattice. The high capacity and reversibility observed for the peo-$MoS_2$ composite confirm that the presence of PEO does not impede but facilitate the intercalation and diffusion of non-lithium cations.

Figure 8:
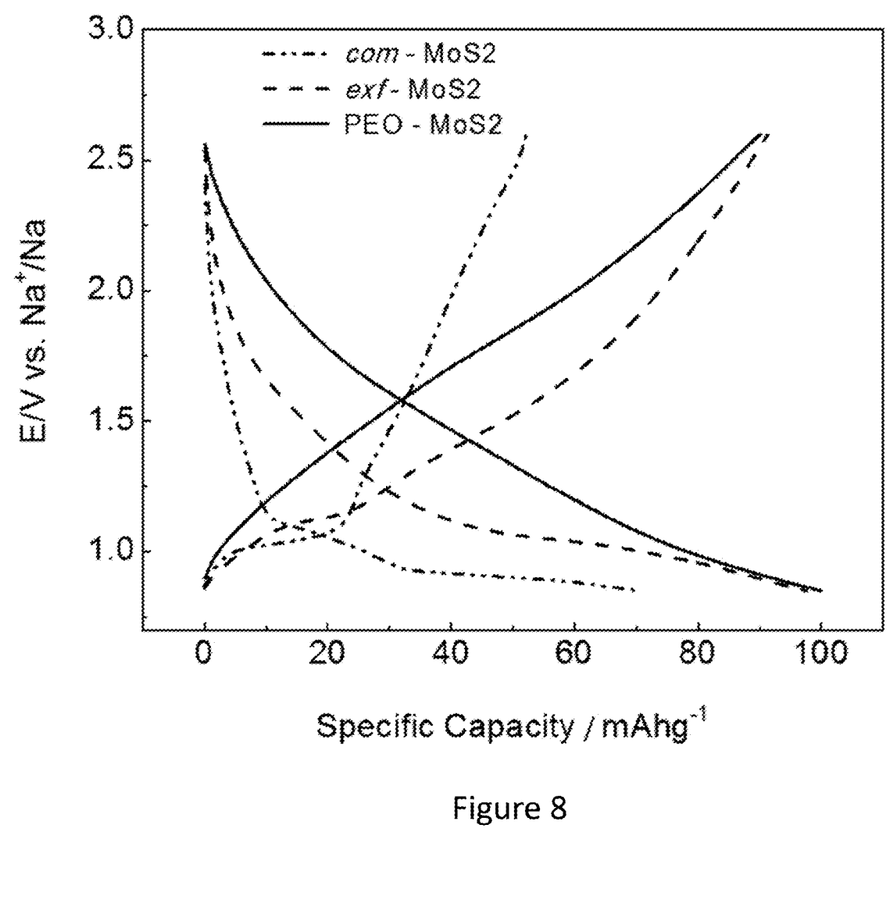
FIG. 8 illustrates the discharge-charge profile of sodium intercalation in $MoS_2$ samples with different interlayer distance at the second cycle.
Figure 9:
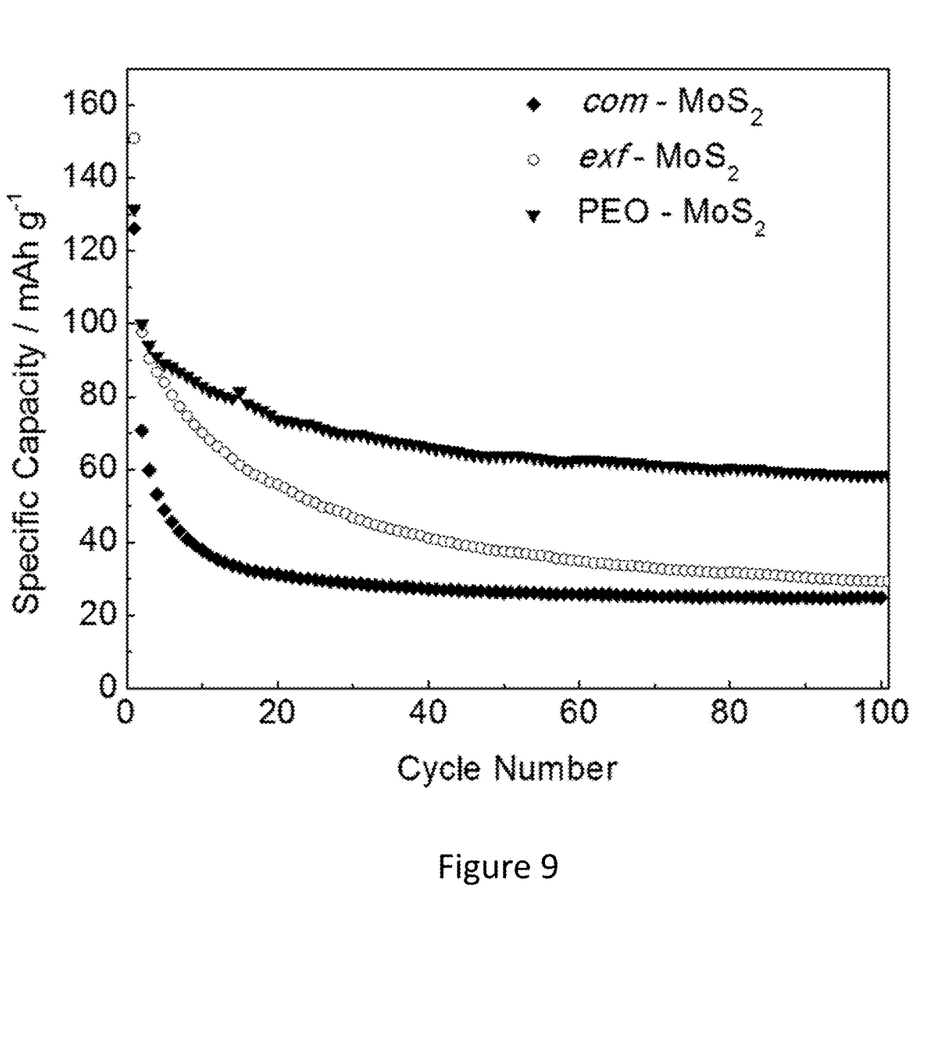
FIG. 9 illustrates the cycling stability of sodium intercalation in $MoS_2$ samples with different interlayer distance.

Example 4: $MoS_2$ Composites with Different Interlayer Distance as Intercalation Host for Na-Ion The electrochemical performance of $MoS_2$ composites as intercalation host materials for Na-ion was demonstrated with two-electrode cells. Working electrodes were fabricated with the same method as for those electrodes used in Mg-ion cells. Freshly sliced metallic sodium was used as both the counter and reference electrode. A solution of 1 M $NaClO_4$ in dimethoxyethane served as the electrolyte. At the same charge-discharge current density of 84 mA/g, the three $MoS_2$, i.e. com-$MoS_2$, exf-$MoS_2$, and peo-$MoS_2$, deliver comparable first discharge capacity of 126, 151, and 132 mAh/g, respectively shown in FIG. 8. All samples experience capacity reduction over cycling but at different rate. The capacity for com-$MoS_2$ was halved over 2 cycles, while the same degree of fading for exf-$MoS_2$ and peo-$MoS_2$ took 8 and 44 cycles to complete, respectively FIG. 9, indicating improved reversibility of the intercalation process in the host with larger interlayer distance.

Where numerical ranges or limitations are expressly stated in the disclosure of the exemplary embodiments contained herein, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as "comprises", "includes", and "having" means "including but not limited to" and should be understood to also provide support for narrower terms such as "consisting of", "consisting essentially of", and "comprised substantially of". Accordingly, the scope of protection is not limited by the description set out above but is defined by the claims that follow, that scope including all equivalents of the subject matter of the claims. Each and every claim is incorporated into the specification as further disclosure, and the claims are each an embodiment of the present invention. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural or other details supplementary to the disclosure.

What is claimed is:

1. A method of fabrication and use of a battery electrode, comprising:
    delaminating an electrode material comprising $A_xM_yN_z$,
    exposing the delaminated $A_xM_yN_z$ to a solution containing the insertion species, such that the insertion species intercalate $A_xM_yN_z$ layers;
    restacking the delaminated $A_xM_yN_z$ around the insertion species to form a battery electrode, wherein restacking comprises forming an electrode of a layered structure comprising $A_xM_yN_z$, a pillaring agent, and at least one non-lithium metal ion $X^{n+}$, wherein, in a first state, the layered structure comprises a first layer of $A_xM_yN_z$ a second layer of $A_xM_yN_z$, and a spacing between the first and the second layers, wherein the pillaring agent and the non-lithium metal ion are disposed between the first layer and the second layer of the $A_xM_yN_z$; and
    cycling the battery electrode for a plurality of cycles, wherein, in a second state, subsequent to a plurality of battery electrode cycles, the pillaring agent remains disposed between the first and second layers and the layered structure is configured to maintain the spacing of the first state.

2. The method of claim 1, wherein the delaminating $A_xM_yN_z$ electrode material comprises at least one method chosen from the group consisting of physical exfoliation, electrochemical reduction/oxidation, and chemical reduction/oxidation.

3. The method of claim 1, wherein the restacking the delaminated $A_xM_yN_z$ around the insertion species comprises at least one method chosen from the group consisting of filtration, centrifugation, drying, or combinations thereof at a temperature ranging from −80° C. to 150° C.

4. The method of claim 1, wherein the non-lithium metal ions comprise a formula $X^{n+}$, wherein X is at least one non-lithium metal chosen from the group consisting of Na, K, Mg, Ca, Al, Ga, and Y, and $1 \leq n \leq 3$.

5. A battery comprising:
an electrolyte; and
at least one electrode material architecture comprising a layered structure comprising $A_xM_yN_z$, a pillaring agent, and at least one non-lithium metal ion $X^{n+}$
    wherein the layered structure comprises a first layer of $A_xM_yN_z$ a second layer of $A_xM_yN_z$, and a spacing between the first and the second layers, wherein the pillaring agent and the non-lithium metal ion are disposed between the first layer and the second layer of the $A_xM_yN_z$; and
    wherein the layered structure is configured such that, subsequent to a plurality of battery electrode cycles, the pillaring agent remains disposed between the first and second layers and the spacing between the first and second layers does not change;
    A is at least one low-valence element chosen from the group consisting of
    H, alkaline, and alkaline earth metals, and $0 \leq x \leq 1.5$;
    M is at least one metal and $1 \leq y \leq 2.5$;
    N is at least one non-metal element chosen from the group consisting of O, S, Se, N, P, Br, and I, and $1.8 \leq z \leq 4.2$; and
    X is at least one non-lithium metal ion chosen from the group consisting of Na, K, Mg, Ca, Al, Ga, and Y, and $1 \leq n \leq 3$.

6. The battery of claim 5, wherein a low-valence element further comprises at least one chosen from the group consisting of Li, Na, K, Mg, and Ca.

7. The battery of claim 5, wherein at least one metal comprises a metal chosen from the group consisting of Ti, Zr, V, Ta, Cr, Mo, W, Mn, Fe, Co, Ni, Cu, Zn, Cd, Ga, In, Sn, Pb, Sb, Bi, and Te.

8. The battery of claim 5, wherein the pillaring agent comprises at least one electrically neutral polymer containing O, N, F, and/or S atoms chosen from the group consisting of poly(ethylene oxide), poly(propylene glycol), poly(vinylpyrrolidinone), methyl cellulose, poly(methyl acrylate), polyacrylonitrile, polyethyleneimine, poly(aniline), and polypyrrole.

9. The battery of claim 5, wherein the pillaring agent comprises at least one electrically neutral molecule containing O, N, F, and/or S atoms chosen from the group consisting of alkylamines and glymes.

10. The battery of claim 9, wherein the alkylamines comprise at least one molecule chosen from the group consisting of diethylamine, dibutylamine, dipentylamine, N-isopropylcyclohexylamine, and dicyclohexylamine.

11. The battery of claim 9, wherein the glymes consist of at least one molecule chosen from the group consisting of diglyme, triglyme, and tetraglyme.

12. The battery of claim 5, wherein the non-lithium metal ions are positioned within the lattice spacing of $A_xM_yN_z$ and induce a lattice expansion of 1-300% in at least one dimension.

* * * * *